J. F. O'CONNOR.
FRICTION SHOCK ABSORBING MECHANISM.
APPLICATION FILED MAR. 12, 1918.
1,302,076.
Patented Apr. 29, 1919.
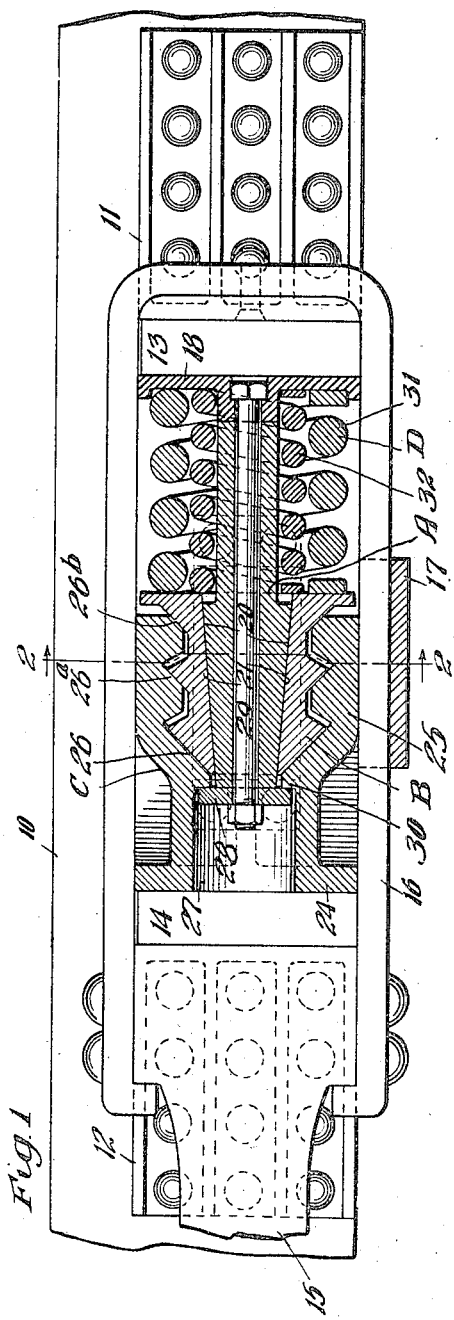
INVENTOR.
John F. O'Connor
BY George J. Haigh
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,302,076.  Specification of Letters Patent.  Patented Apr. 29, 1919.

Application filed March 12, 1918. Serial No. 221,920.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

The object of this invention is to provide a relatively inexpensive friction shock absorbing mechanism having high capacity and certain release and which is more particularly adapted for use in railway draft riggings.

In the drawing forming a part of this specification, Figure 1 is a part elevational view, part vertical, longitudinal section of a portion of a railway draft rigging showing my improvements in connection therewith. Fig. 2 is a vertical, transverse, sectional view, taken on the line 2—2 of Fig. 1. And Fig. 3 is a detail perspective view of one of the friction blocks.

In said drawing, 10—10 denote channel-shaped center or draft sills, to the inner faces of which are secured rear stops 11 and front stops 12 in the usual manner. Coöperable with the rear stops 11 is a rear follower 13 and with the front stops 12, a front follower 14, the shock absorbing mechanism being interposed between the followers 13 and 14. The shock absorbing mechanism is connected to the draw bar 15 in any suitable manner as by the yoke strap 16 and all parts are supported by a saddle plate 17 bolted to the flanges of the draft sills 10.

The shock absorbing mechanism proper, as shown, includes a central friction post A; a series of friction blocks B; a shell C; and a spring resistance D.

The central friction post A is provided at its rear or inner end with a preferably separable plate or follower 18 and at its forward end with a tapered section 19 having six wedging faces 20—20.

Each of the friction blocks B, of which there are six, one for each of the wedge faces 20 of the post A, is provided on its inner side with an inclined wedging face 21 coöperable with the corresponding wedge face 20 of the post and on its outer side is provided with a plurality of wedge faces 23, 23$^a$ and 23$^b$. The wedge faces 23, 23$^a$ and 23$^b$ of each block B are made parallel and are at a comparatively blunt angle with respect to the axis of the shock absorbing mechanism, whereas the angle of the coöperating friction faces 20 and 21 is comparatively acute with respect to the same axis.

The shell C is provided at its front end with a follower or plate 24 which directly engages the front follower 14 and rearwardly thereof with the true friction shell portion 25. The latter is substantially cylindrical on its outer side but on its interior is provided with six sets of wedge faces 26, 26$^a$ and 26$^b$ coöperable with the corresponding wedge faces 23, 23$^a$ and 23$^b$, respectively, of the friction blocks B. The front end of the shell C is recessed, as indicated at 27, so as to permit the employment of a washer 28 adapted to be held in place by a retaining bolt 29 that extends through said washer and through said post A. It will be noted that the washer 28 engages an internal shoulder 30 on the shell C so that the parts are held in assembled relation.

The spring D preferably consists of an outer heavy coil 31 and an inner lighter coil 32, said coils engaging at their rear ends against the plate 18 and at their forward ends against the inner ends of the friction blocks B. It will be noted that there is sufficient clearance left between the wedge sections of the blocks B and shell C to permit the former to move rearwardly relatively to the latter for the purpose hereinafter described.

In operation, when pressure is transmitted to the shell C as in buffing, the shell C will move rearwardly and at the same time force the friction blocks B in the same direction. Due to the taper of the post A, the friction blocks B in their rearward movement with the shell C will at the same time be forced outwardly or radially and consequently said blocks B will travel at a slightly faster rate than the shell C, which explains the necessity for the clearance between the blocks B and shell C, hereinbefore referred to. The rearward movement of the shell C and blocks B will, of course, be resisted by the spring D. Upon release of the pressure from the shell C, the latter will be free to move outwardly and there will be no danger of sticking between the shell C and blocks B because of the blunt angle of the wedging faces 23 and 26, etc., with respect to the axis of the mechanism. This, in turn, permits the blocks B to be forced outwardly by expansion of the spring D. In this way, I am enabled to obtain a certain release and it is also evident that I obtain an exceedingly high capacity, due to the comparatively acute angle of the wedging faces 20 and 21 with respect to the axis of the shell. The mechanism may be manufactured at comparatively small expense; the metal usually employed in forming a spring casing or cage is eliminated; and the construction is also such that the spring D may be of that type commonly known as a class "G" spring and the over-all length of the friction mechanism designed so as to be accommodated between the usual spacing of stops provided for friction gears.

I claim:

1. In a friction shock absorbing mechanism, the combination with a friction post having a tapered section at one end; of an outer single piece friction shell having a plurality of interior wedge faces separated longitudinally of the shell; a plurality of friction blocks interposed between said post and said shell, each of said blocks having an interior wedge face engaging and coöperable with the tapered post and a plurality of exterior wedge faces engaging and coöperable with a plurality of the wedge faces of the shell; and a spring to resist movement of said blocks relatively to the post.

2. In a friction shock absorbing mechanism, the combination with a central friction post having a tapered section; of an outer friction shell having a series of sets of wedge faces on the interior thereof, each set comprising a plurality of wedge faces and arranged at a relatively blunt angle with respect to the axis of the shell; a series of friction blocks, each block having an inner wedge face coöperable with the tapered section of the post and a set of wedge faces engaging and coöperable with one of the sets of wedge faces of the shell; and spring means for resisting relative movement between the blocks and post.

In witness that I claim the foregoing I have hereunto subscribed my name this 26th day of Feb., 1918.

JOHN F. O'CONNOR.